Aug. 17, 1965    H. J. DE HAUT    3,200,638
TESTING OF LUBRICANTS AND THE LIKE
Filed June 7, 1963    2 Sheets-Sheet 1

HENRI J. DE HAUT
INVENTOR

BY
*Herman S. Blodgett*
ATTORNEY

HENRI J. DE HAUT
INVENTOR

United States Patent Office 3,200,638
Patented Aug. 17, 1965

3,200,638
TESTING OF LUBRICANTS AND THE LIKE
Henri Jacobé de Haut, Viroflay, France, assignor to Society Orogil, Paris, France, a corporation of France
Filed June 7, 1963, Ser. No. 286,293
Claims priority, application France, June 12, 1962, 900,384
10 Claims. (Cl. 73—64)

This invention relates to the testing of lubricants and the like and, more particularly, to a process and apparatus for testing the heat resistance of various liquids, particularly lubricants, heat transfer liquids, and electrical insulating liquids.

Because of the fact that modern motors work under very severe conditions, with the progress in motor development, the temperatures have become more and more elevated and unit pressures on certain moving parts in contact are extremely high. In order to provide for lubrication to withstand such conditions, various additives on "dopes" are added to the lubricating fluids, each additive being used for a specific purpose. Before they are used, however, such additives must necessarily be subjected to preliminary experimentation. The most accurate procedure, of course, is to test the doped oils in the motors themselves; however, these tests are lengthy and expensive, so that laboratory methods have been sought which would be more rapid and less onerous and which would permit a preliminary choice to be made. Of the tests employed, some relate to the heat resistance and detergent effect of the oils in the presence or absence of oxygen. One such test, for instance, consists in studying the coking power of the lubricant by projecting it against a plate which is maintained at a high temperature. After a given time has passed, the increase in weight of the plate brought about by the carbon deposits is then determined. At the same time, the color and nature of the deposits (which usually consist of a blackish residue) are noted. Several procedures and forms of apparatus have been based upon this method of testing. However, they have all suffered from a number of disadvantages, the main one being that the tests are not repeatable. The main difficulty is that the temperature is taken at a single point and so is not representative of the average temperature of the plate. Furthermore, during the projection of the fluid on the plate the amount of fluid is not measured and it varies from one test to another. At the same time, the known forms of apparatus of the this kind do not allow certain very useful properties of the liquid to be investigated. For example, they are not capable of testing the temperature at which breakdown of the oils commences, the nature and speed of degradation of the oil reserve, the nature and amount of the deposits formed by the degraded oil, the influence of the quantity of atomizing air, or the influence of the quantity of oil in circulation on the hot parts per unit time. These and other difficulties experienced with the prior art procedures and apparatus have been obviated in a novel manner by the present invention.

It is, therefore, an outstanding object of the invention to provide for the testing of liquids in such a manner that reproduceability of test conditions is assured.

Another object of this invention is the provision of an apparatus for the testing of lubricants wherein inaccuracies in the measurement of local temperatures are removed.

A further object of the present invention is the provision of an apparatus for the testing of lubricants wherein the quantity of fluid used in a given time is accurately measured.

It is another object of the instant invention to provide apparatus for testing of lubricants wherein the temperature may be measured at which destruction of the lubricant begins.

It is a further object of the invention to provide an apparatus for the testing of lubricants wherein the nature and amount of the deposits formed by the breakdown of the oil may be accurately determined.

A still further object of this invention is the provision of an apparatus for the testing of lubricants in which means is provided for indicating in a single test the behavior of the liquid being tested as a function of temperature between given limits.

Although the novel features which are believed to be characteristic of this invention will be particularly pointed out in the claims appended hereto, the invention itself, as to the its objects and advantages, the mode of its operation and the manner of its organization may be best understood by reference to the following description taken in connection with the accompanying drawings forming a part thereof, in which:

FIG. 3 is an enlarged view of a section of the apparatus.

Figure 1:
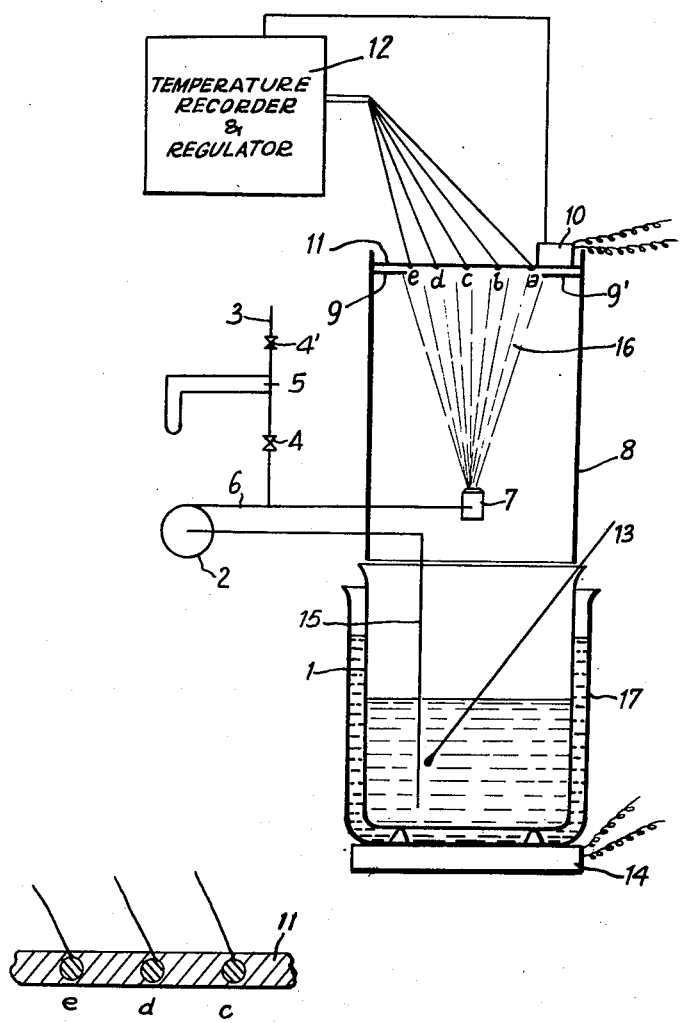
FIG. 1 is a diagrammatic view in vertical section of one form of apparatus constructed according to the principles of the present invention.

In a general way, the process performed in accordance with the present invention consists in heating a thermally-conductive plate so as to create a temperature gradient between two different regions of the plate and in projecting onto the plate the liquid to be tested. Temperature measurements are preferably affected during projection of the liquid at a plurality of points situated at the various regions of the plate. The plate is then examined and, if required, weighed after a given duration of heating and of projection of the liquid. The creation of a temperature gradient between two regions in a plate has the effect of giving a zone of progressively varying temperature between the two regions. The method of accomplishing this is, in the preferred embodiment, obtained by heating one of the regions to a certain maximum temperature. However, it can also be accomplished by heating the two regions, one to the maximum temperature and the other to the minimum temperature, or it can be done by cooling one and heating the other.

According to the preferred embodiment, the liquid is projected in the form of droplets obtained by atomization. The jet has the form of a simple cone, the base being entirely filled with droplets so that the surface of the plate is sprayed uniformly. Naturally, the cone can be flattened so as to have an elliptical cross-section, if the surface to be sprayed is of greater length than breadth. Another important feature of the invention is that the amount of liquid projected is regulated and is maintained constant during each test. Futhermore, when the projection of the liquid is accompanied by a gaseous stream, this stream is also maintained at a predetermined value. The atomization gas is blown out with the liquid droplets and may be air, oxygen, oxygenated air, or a gas, for example. It is preferable to effect atomization of the liquid under a constant pressure for a given test. According to one way of carrying out the novel process, the liquid to be studied is pre-heated and is maintained at a given temperature before being projected onto the plate. It is preferable to recover the liquid after it has been projected and returned it to the desired temperature for re-projection. Then, the plate may be replaced by a new plate at pre-determined intervals of time in order to determine the behavior of the liquid which has been subjected to heating as a function of time.

The invention also provides a novel and practical system for representation of the test results. According to this system, a graph is plotted to characterize the state of the surface of the plate after the test. For this there are used as ordinates quantities representing, for example, the exterior aspect, the color, the roughness, the coefficient of reflectance, the thickness of the deposit formed and the weight, as well as other characteristics. This quantity can result from measurements or from observations expressed as relative numbers. As abscissae lengths proportional to the distances counted from a given point in the coldest region of the plate are counted. The graph thus gives the observed state of the surface at all points of the plate over the entire length of the applied temperature gradient. Furthermore, with the same abscissae and with temperatures as ordinates, a second curve is plotted which gives the temperature variation along the plate during the test. At the characteristic points of the first graph, which correspond to the variations in the state of the surface, lines are traced parallel to the ordinates which intersect with the second curve or temperature graph. The points of intersection indicate the temperatures at which the changes have occurred. By orthogonal projection of these points onto a system having the same ordinance as the second curve (that is, temperatures) and the surface states or conditions as abscissae a new third curve is obtained directly which gives the relationship between the surface states and the temperatures for the same plate.

It is then easy to obtain from the last graph the percentage of surface of the plate which has undergone change due to the effect of the temperature gradient chosen. The apparatus for carrying out the process described above consists of a replaceable plate of thermally-conductive material, of a support for the plate, of means for heating a part of the plate, and of thermometers for measuring the temperature at various points thereof, as well as means for projecting onto the plate the liquid to be studied. The replaceable plate can be plane or curved; it can, for instance, have the form of a spherical dome-like segment, in which case the jets of liquid directed on it may have the same length, if the atomizer is placed at the center of the imaginary sphere corresponding to the segment. The plate can be placed vertically or obliquely, but its disposition is preferably horizontal, the jets of liquid being directed upwardly in order to impinge upon the lower face of the plate.

Preferably, the apparatus of the invention comprises a receptacle for preheating or cooling the liquid to be tested so as to provide a given temperature. In a particularly suitable embodiment, the receptacle includes at its upper portion an opening in which the plate to be subjected to the temperature gradient is placed horizontally, either directly or upon a separate support. The liquid projected onto the plate then falls into the receptacle and can be employed for further projection by means of a device such as a pump. The heating of the plate is brought about by electrical resistance heaters, by radiation from tubes containing hot gases, or by any other known means suitable for heating a given part of the surface. When the apparatus includes means for cooling a region of the plate so as to set up the desired temperature gradient, the cooling means can consist of tubes traversed by a fluid and it can also consist of nozzles for blowing the cooling gas. The most suitable disposition of the heating means is on the face of the plate opposite that which receives the jets of liquid. However, where heating takes place by radiation, it is possible, of course, to heat the same side of the plate on which the liquid is projected. A preferred means for measuring the temperature consists of thermocouples applied to the plate in the well-known manner.

Referring first to FIG. 1, wherein is shown the apparatus for carrying out the invention, a receptacle 1 is provided containing a quantity of engine oil whose behavior and detergent effect at different temperatures is to be studied. In the preferred embodiment, the receptacle is shown as having a capacity of two liters and containing 0.25 to 1.5 liters of engine oil. The receptacle 1 is surmounted by a vertical duct 8, the upper portion of which is provided with a transversely-extending support 9, 9' for carrying a replaceable plate 11. The cross-sectional shape of the duct 8 is circular. The support 9, 9' consists of a plate having a rectangular opening on which is located the rectangular plate 11. In the preferred embodiment, the plate measures 50 millimeters by 90 millimeters but, of course, the plate, duct, and support can have other shapes and dimensions, if required. An electrical resistance heater 10 is shown applied against the upper face of the plate 11 and is maintained in position by means of clips or other equivalent means not shown in the drawing.

Thermocouples $a$, $b$, $c$, $d$, and $e$ are introduced into transverse passages extending through the plate 11, the channels being parallel to and as near as possible to the lower face of the plate 11, as shown in FIG. 3. The thermocouple wires are connected to a recorder-regulator 12 which controls the heater element 10. At the base of the receptacle 1 is located a thermometer 13 which provides for the control of the temperature of the liquid within the receptacle. The bottom of the receptacle rests upon an electric heater 14 and heat is transferred through an intermediate bath 17 for maintaining the liquid in the receptacle 1 at a constant temperature. The heater 14 is adjusted in accordance with the indications of the thermometer 13. A conduit 15 is mounted with one end located in the vicinity of the base of the receptacle 1 within the body of liquid contained therein and is connected at its other end to the inlet of volumetric pump 2. The outlet of the pump is connected by means of a conduit 6 to an atomizer 7 having an upwardly-directed orifice. The form of the atomizer, which is most particularly advantageous, is one arranged so as to impart to the jets 16 of liquid the form of a flattened ray or rod. The size of the pattern of the jets as it strikes the plate 11 is substantially elongated so that the lower face of the plate 11 between the supports 9 and 9' is entirely sprayed in an even manner. This is not generally accomplished with ordinary sprays or atomizers having circular jets because in these devices the spray varies in intensity between the center and the periphery.

Also connected to the conduit 6 is a pipe 3 which is provided with a valve 4' for the supply of gas from a source of the well-known type. The valve 4' serves to adjust the output of gas which, in turn, is measured by means of a flow meter 5 and a valve 4 resides between the flow meter 5 and the conduit 6.

The operation of the apparatus will now be readily understood in view of the above description. For example, in connection with a test between 250° C. and 330° C. on an engine oil, the oil is introduced into the receptacle 1 and is maintained at a temperature of 50° C. by means of the heater 14. The plate 11 may be formed of a metal, such as iron, steel, stainless steel, aluminum, or an aluminum alloy, and this is placed at the top of the duct 8 on the supports 9, 9'. The heater element 10 is applied to the plate and the current is adjusted to give a temperature of 330° at the thermocouple a. The pump 2 is operated, the valve 4' is opened, and the output is adjusted by the valve 4. A constant amount of oil and air is projected onto the plate 11 through the atomizer 7. The output can vary from one test to another. It is possible, for example, to project from 50 to 5,000 ml. of oil with volumes of gas in the order of 1 to 10 times those of the oil. The droplets of oil fall into the receptacle 1 after impinging upon the lower face of the plate 11.

During the operation of the atomizer 7, the temperatures indicated by the thermocouples a, b, c, d, and e are conveyed to the recorder-regulator 12 which provides for maintaining the temperatures constant within 2° C. The thermocouples, which lie in their passages perpendicular to the plane of the drawing along the length of the plate, as shown in FIG. 3, are isothermals. The maximum temperature is at the thermocouple a and the minimum at the thermocouple e, the gradient being the difference between these two extreme temperatures. The duration of the test with any one plates varies according to the nature of the liquid studied and the information desired. It may last, for example, from 10 to 120 minutes. In the case of engine oils with a maximum temperature in the range from 200° C. to 350° C. and a gradient of 50° to 60° C., operation with one plate is generally maintained from 30 to 60 minutes. To study the breakdown of the oil with time, it is desirable to run the test several times with the liquid used in preceding tests, but by replacing the plate with another plate each time. The total duration of such a series of tests can with advantage be from 1 to 10 hours. It would be longer with liquids which alter slightly and leave little trace upon the plate. The graphs shown in FIG. 2 contain the results of the test upon a single plate. At the end of the test on the plate, changes or alterations are observed. The various regions of the plate generally undergo different effects as a function of temperature. In certain regions a more or less compact deposit of carbon or tar or any other material may be formed and the color may be variable according to the nature of the liquid studied. Also, corrosion can sometimes occur. These observations are very important as they indicate the results of the test. They can be effected qualitatively by a simple visual observation of the state of the surface of the plate, with the addition of notes to signify the importance of the changes observed. Inspection of the plate can also be augmented by the physical, chemical, or physical-chemical measurements. For example, of weight, thickness, reflectance, absorption of a reactant, thermal conductivity, electrical conductivity, electrical capacity, and the like, may be measured.

Figure 2:
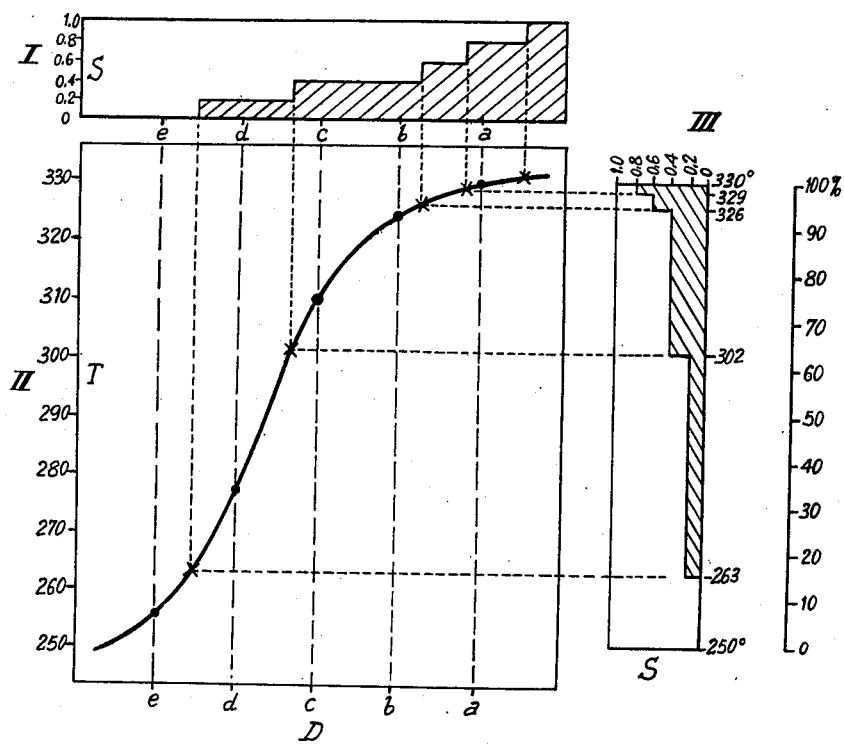
FIG. 2 shows a graphical representation of the results of the test upon a lubricant.

Whatever the mode of observation of the state of the surface of the plate, quantities of coefficient S defining this state are plotted as ordinates on the graph I of FIG. 2. The abscissae D are lengths proportional to the distances from a chosen point in the cool part of the plate. The step-like trace of the graph I gives the values of S from 0 to 1 of the aspects of the altered regions of the plate. The increases between two adjacent flat portions correspond to the changes observed, particularly passage in color from yellow, then to brown, to red, to dark brown, and then to black.

The graph II gives the temperature at various transverse, substantially isothermal sections of the plate 11 as a function of the distances D from the coolest part. These distances are previously known from the pre-determined positions of each of the thermocouples a, b, c, d, and e. In the example chosen, the graph is defined by 256° C. at e, 276° C. at d, 310° C. at c, 325° C. at b, and 330° C. at a.

The new method of representation in accordance with the invention shows the graph I as drawn above the graph II or on the same vertical lines as the uprights of the graph I so as to cover the curve II. This gives graphically the temperatures at which the various changes mentioned are produced. It will be seen, in effect, on the graph II that in the example given the temperatures characteristic of the passage of the surface from this initial state from yellow, brown, black, etc. are 260° C., 302° C., 326° C., 329° C. and 332° C., marked in each case by an X. From these points it is possible to plot by orthogonal projections with relation to the graph II the graph of the state of the surface of the plate as a function of the temperature. Graph III is thus produced, the abscissae of which are based upon the coefficient S and the ordinance on the temperatures T.

As can be seen, the process and apparatus of the invention offer a considerable advantage in characterizing the behavior of a liquid as a function of temperature in a single test, although all the prior art method require an entire series of tests at different temperatures. The special method of representing the results by graphical means adds to the convenience of the new method. It also should be noted that there is excellent repeatability of the results in the system. In the examples stated the results can be reproduced by an operator to ±1% when repeating a test with the same adjustments for the gas and liquid outputs at the same temperatures. It is known that, with prior art apparatus, discrepancies between the results are much larger.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

1. Apparatus for testing a liquid comprising a replaceable plate of thermally-conductive material, a support on which the plate is carried, means for creating a temperature gradient across the plate, temperature-measuring devices measuring the temperature at various points on the plate, and means for projecting onto the plate the liquid to be studied.

2. Apparatus as recited in claim 1 wherein the support carrying the plate is mounted upon a receptacle for the liquid to be tested.

3. Apparatus as recited in claim 2 wherein the receptacle is provided means for pre-heating the liquid.

4. Apparatus as recited in claim 1 wherein the means for projecting consists of an atomizer located below the plate and directed upwardly toward it.

5. Apparatus as recited in claim 3 wherein the means for heating are electrical resistance elements.

6. Apparatus as recited in claim 1 wherein the temperature-measuring devices are thermo-couples connected to a recorder-regulator which adjusts the element heating the plate.

7. Apparatus as recited in claim 2 wherein is provided a pump and a tube for drawing liquid from the receptacle and projecting it onto the plate.

8. Apparatus as recited in claim 1 wherein the means for projecting includes a gas inlet with means for adjusting the amount of gas flowing.

9. Apparatus as recited in claim 1 wherein are provided transverse channels lying within the thickness of the plate which serve to house the temperature-measuring devices.

10. Apparatus for testing a lubricant or the like, comprising
 (a) a receptacle for receiving a quantity of the lubricant,
 (b) a vertically-directed duct overlying the receptacle,
 (c) support means located at the upper end of the duct,
 (d) a test plate resting on the support means and having an undersurface directed downwardly toward the receptacle, (e) an atomizer located in the duct and adapted to direct a spray toward the said under surface, the spray striking the under surface at a predetermined pattern,
(f) means for producing a temperature gradient in the plate across the pattern,
(g) a plurality of temperature measuring devices located in the plate along the line of the gradient, and
(h) means for recording the measurements from the said devices.

References Cited by the Examiner
UNITED STATES PATENTS

| | | | |
|---|---|---|---|
| 1,024,872 | 4/12 | Wendt | 73—64 |
| 2,729,970 | 1/56 | Faris et al. | 73—64 |
| 2,825,222 | 3/58 | Stone | 73—15 |

RICHARD C. QUEISSER, *Primary Examiner.*
DAVID SCHONBERG, *Examiner.*